United States Patent [19]

Nakajima et al.

[11] Patent Number: 5,794,499
[45] Date of Patent: Aug. 18, 1998

[54] METHOD OF AND APPARATUS FOR DISASSEMBLING CAN FOR MEASUREMENT OF CAN SEAM DIMENSIONS

[75] Inventors: Toshiyuki Nakajima; Akira Okauchi; Setuo Hujino; Hirokazu Taya; Tomoki Shimoda; Seiji Ohshiba, all of Ibaragi, Japan

[73] Assignee: Sapporo Breweries Ltd., Tokyo, Japan

[21] Appl. No.: 803,911

[22] Filed: Feb. 21, 1997

Related U.S. Application Data

[63] Continuation of Ser. No. 495,681, filed as PCT/JP94/01669, Oct. 6, 1994 published as WO95/15237, Jun. 8, 1995, abandoned.

[30] Foreign Application Priority Data

Dec. 3, 1993 [JP] Japan ................................. 5-303704

[51] Int. Cl.$^6$ ................................................. B23B 5/14
[52] U.S. Cl. ................. 82/1.11; 82/102; 82/113; 83/54; 29/426.4
[58] Field of Search .................. 82/1.11, 101, 113, 82/102, 165; 29/426.3, 426.4, 426.1, 426.2; 83/54, 856, 564

[56] References Cited

U.S. PATENT DOCUMENTS

| | | | |
|---|---|---|---|
| 1,319,395 | 10/1919 | Huddleston | 29/426.4 |
| 3,006,070 | 10/1961 | Nordquist | |
| 3,802,363 | 4/1974 | Langewis | 82/101 X |
| 3,862,698 | 1/1975 | Hafele | 82/101 X |
| 3,875,833 | 4/1975 | Kannegiesser et al. | 82/101 X |
| 3,986,415 | 10/1976 | Adamson | |
| 4,130,036 | 12/1978 | Thomas | 82/102 X |
| 4,148,402 | 4/1979 | Atkinson | 82/102 X |
| 4,510,830 | 4/1985 | Post | 83/54 X |
| 4,949,605 | 8/1990 | Geller et al. | 82/101 X |
| 4,959,902 | 10/1990 | Hamilton | 82/101 X |
| 5,205,195 | 4/1993 | Crosslen et al. | 82/101 X |

FOREIGN PATENT DOCUMENTS

| | | |
|---|---|---|
| 1 515 065 | 1/1968 | France . |
| 35 13 931 | 2/1988 | Germany . |
| 36 27 967 | 4/1988 | Germany . |
| 91 07 019 | 9/1991 | Germany . |
| 55-129692 | 10/1980 | Japan . |
| 57-140843 | 8/1982 | Japan . |
| 101 584 | 10/1923 | Switzerland . |

*Primary Examiner*—Andrea L. Pitts
*Assistant Examiner*—Henry W. H. Tsai
*Attorney, Agent, or Firm*—Oblon, Spivak, McClelland, Maier & Neustadt, P.C.

[57] ABSTRACT

A can is disassembled by a disassembling apparatus for measurement of can seam dimensions. The can is composed of a can body and an end member which are coupled to each other by a can-seamed region. The can body has an end opening closed by the end thereby sealing the interior of the can. The disassembling apparatus comprises a can holding mechanism (3, 6, 9) for holding the can by gripping the end member and a bottom of the can body, a rotating mechanism (2), for rotating the can about its own axis which is held by the can holding mechanism, and a cutter (23) disposed so as to orient a cutting blade toward the axis of the can for cutting the outer circumferential edge region of the end member which externally surrounds a folded portion of the can body in the can-seamed region in a circumferential direction of the can.

7 Claims, 8 Drawing Sheets

METHOD OF AND APPARATUS FOR DISASSEMBLING CAN FOR MEASUREMENT OF CAN SEAM DIMENSIONS

This application is a continuation of application Ser. No. 08/495,681, filed as PCT/JP94/01669, Oct. 6, 1994 published as WO95/15237, Jun. 8, 1995, now abandoned.

TECHNICAL FIELD

The present invention relates to a method of and an apparatus for disassembling the can-seamed region of a can prior to inspection of dimensions of the can-seamed region.

BACKGROUND ART

Figure 1:
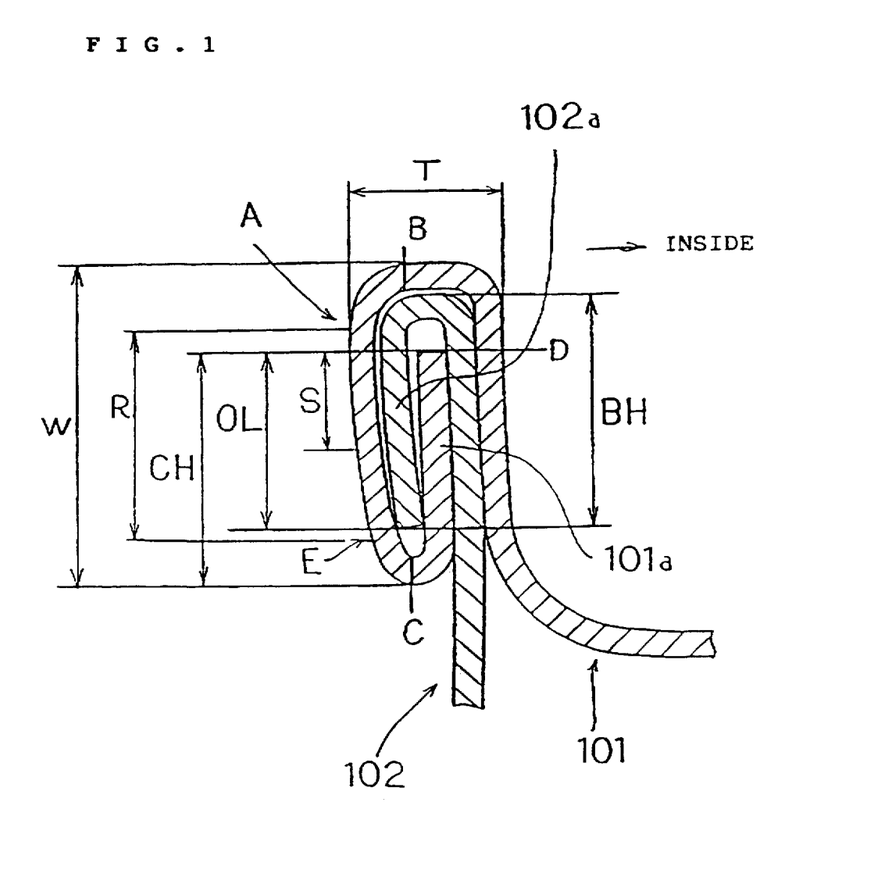
FIG. 1 is a cross-sectional view of the can-seamed region of a can.

To use a metallic can as a container for a carbonated drink such as beer, a beverage, or the like, the liquid is filled in a can body, and an end is fitted in the end opening of the can body. Then, as shown in FIG. 1 of the accompanying drawings, the outer circumferential edge region of an end member 101 and the open end of a can body 102 are can-seamed, thereby closing the end opening of the can body 102. Specifically, the open end of the can body 102 is seamed such that the end 101 covers the outer circumferential edge of the end opening of the can body 102.

If the can seaming is not properly effected, then the interior of the can body is not sealed, allowing the carbon dioxide and the liquid to leak out. To prevent such a problem, the can-seamed end is inspected in the manufacturing process. The inspection is carried out by measuring supervisory dimensions which include, as shown in FIG. 1, the width W and the thickness T of the seamed region, the length CH of a folded portion (hereinafter referred to as a "cover hook 101a") of the outer circumferential edge of the end 101, the length BH of a folded portion (hereinafter referred to as a "body hook 102a") of the can body 102, and the length OL of a portion (hereinafter referred to as an "overlapping portion") in which the cover hook 101a and the body hook 102a overlap each other and are folded, and comparing the measured supervisory dimensions with predetermined reference values. To measure these supervisory dimensions, the can-seamed region is disassembled.

One conventional method of disassembling a seamed region will be described below with reference to FIG. 1, inwardly of the can-seamed region with cutting pliers or a can opener. Then, the remaining portion of the end 101 is forcibly pulled with cutting pliers or nippers, whereupon the end 101 is torn off at a region indicated by the arrow A, leaving the cover hook 101a. Thereafter, the outer circumferential surface of the cover hook 101a is pressed downwardly toward the bottom of the can body with cutting pliers or the like until the cover hook 101a is disengaged from the body hook 102a. When the cover hook 101a is disengaged from the body hook 102a, the supervisory dimensions including the length BH of the body hook 102a and the length CH of the cover hook 101a are measured, and used as supervisory data for the seaming process.

Since the above conventional disassembling method relies on manual work with cutting pliers or the like to disassemble the can-seamed region, portions whose dimensions are to be measured tend to be damaged, e.g., the body hook and the cover hook tend to be deformed or damaged when the end is removed, and the body hook tends to be pressed when the cover hook is removed from the body hook. The operator needs to be skilled enough to disassemble the can-seamed region without deforming those portions whose dimensions are to be measured, and it takes a long period of time to disassemble the can-seamed region. Therefore, the portions whose dimensions are to be measured may be deformed depending on the skill with which the can-seamed region is disassembled, with the result that accurate data may not be obtained.

It has been proposed to employ an X-ray inspecting device for inspecting the can-seamed region of a can with X-rays without disassembling the can-seamed region. The X-ray inspecting device is, however, very large in scale and requires a large investment for the installation of the device. Therefore, the X-ray inspecting device is not suitable for use in carrying out daily inspections on the production site.

DISCLOSURE OF THE INVENTION

It is an object of the present invention to provide a method of and an apparatus for simply disassembling the can-seamed region of a can in a short period of time without deforming portions whose dimensions are to be measured, for measurement of dimensions of the can-seamed region.

To achieve the above object, there is provided in accordance with the present invention a method of disassembling a can for measurement of can seam dimensions, the can being composed of a can body and an end which are coupled to each other by a can-seamed region having an open end of the can body and an outer circumferential edge region of the end, the can body having an end opening closed by the end thereby sealing the interior of the can, the method comprising the steps of holding the can by gripping the end and a bottom of the can body, and cutting the outer circumferential edge region of the end which externally surrounds a folded portion of the can body in the can-seamed region in a circumferential direction of the can.

With the above disassembling method according to the present invention, since the can is held by gripping the end and the bottom of the can body, the can is prevented from being deformed radially inwardly when the can-seamed region is cut. Because the can-seamed region is cut by severing the outer circumferential edge region of the end which externally surrounds the folded portion of the can body in the can-seamed region in the circumferential direction of the can, the end and a cover hook can easily be separated from each other. Therefore, the can may be easily be disassembled without deforming those portions of the can which are to be measured.

According to the present invention, there is also provided an apparatus for disassembling a can for measurement of can seam dimensions, the can being composed of a can body and an end which are coupled to each other by a can-seamed region having an open end of the can body and an outer circumferential edge region of the end, the can body having an end opening closed by the end thereby sealing the interior of the can, the apparatus comprising can holding means for holding the can by gripping the end of the can and a bottom of the can body, rotating means for rotating the can about its own axis which is held by the can holding means, and a cutter disposed so as to orient a cutting blade toward the axis of the can for cutting the outer circumferential edge region of the end which externally surrounds a folded portion of the can body in the can-seamed region in a circumferential direction of the can.

The can holding means may comprise a mechanism for abutting against the end of the can, and a mechanism for abutting against the bottom of the can body, the mechanisms being spaced from each other by an adjustable distance.

The cutter may be movable in the radial direction of the can which is held by the can holding means.

With the disassembling apparatus according to the present invention, the can is held by the can holding means which grips the end of the can and the bottom of the can body, and the can is rotated about its own axis by the rotating means. Then, the cutter with its cutting blade directed perpendicularly to the axis of the can cuts the can-seamed region of the can in the circumferential direction of the can.

BEST MODES FOR CARRYING OUT THE INVENTION

Embodiments of the present invention will be described below with reference to the drawings.

(1st Embodiment)

Figure 2:
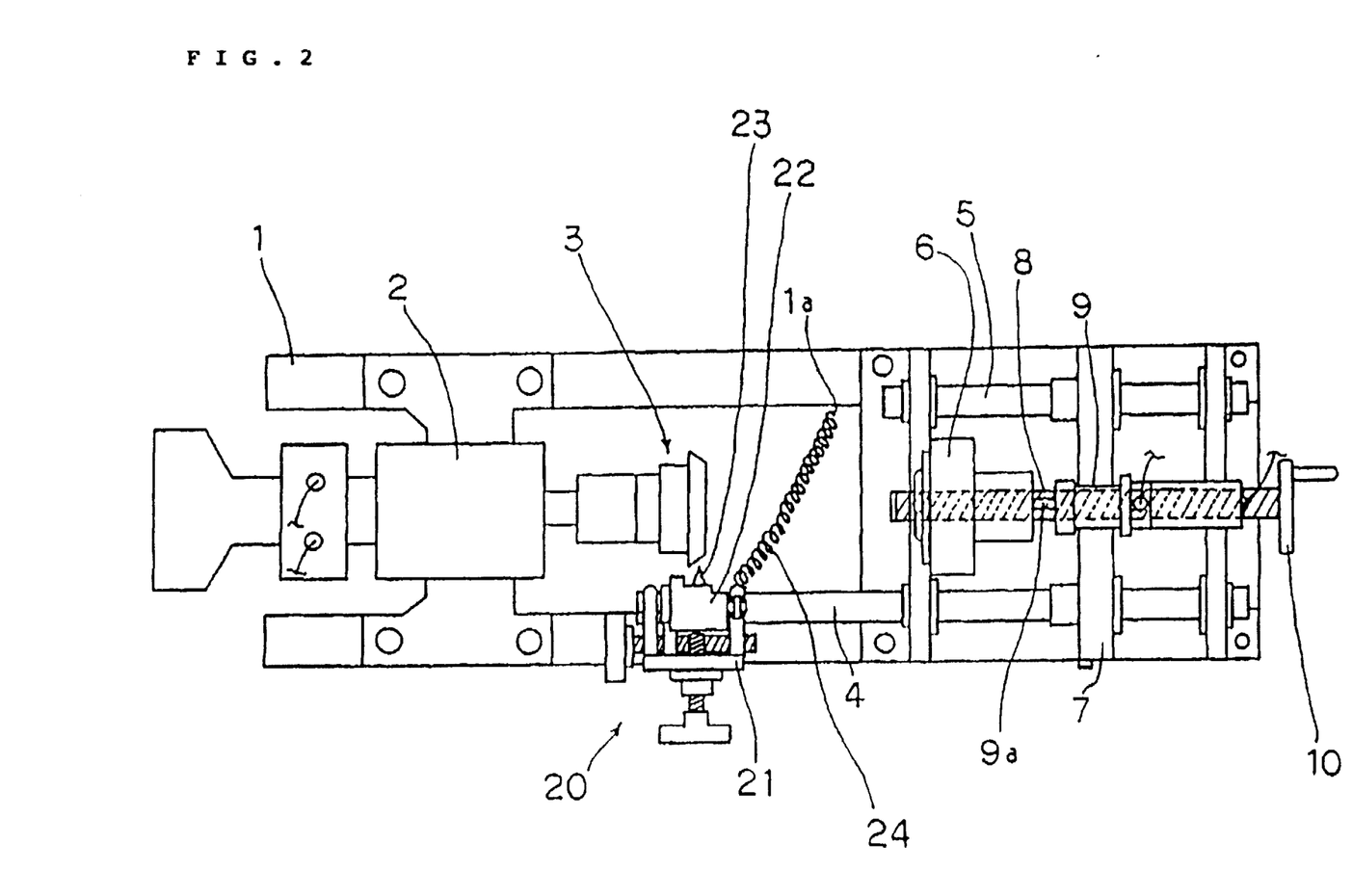
FIG. 2 is a plan view of an apparatus for disassembling a can for measurement of dimensions of the seamed region of the can, according to a first embodiment of the present invention.
Figure 3:
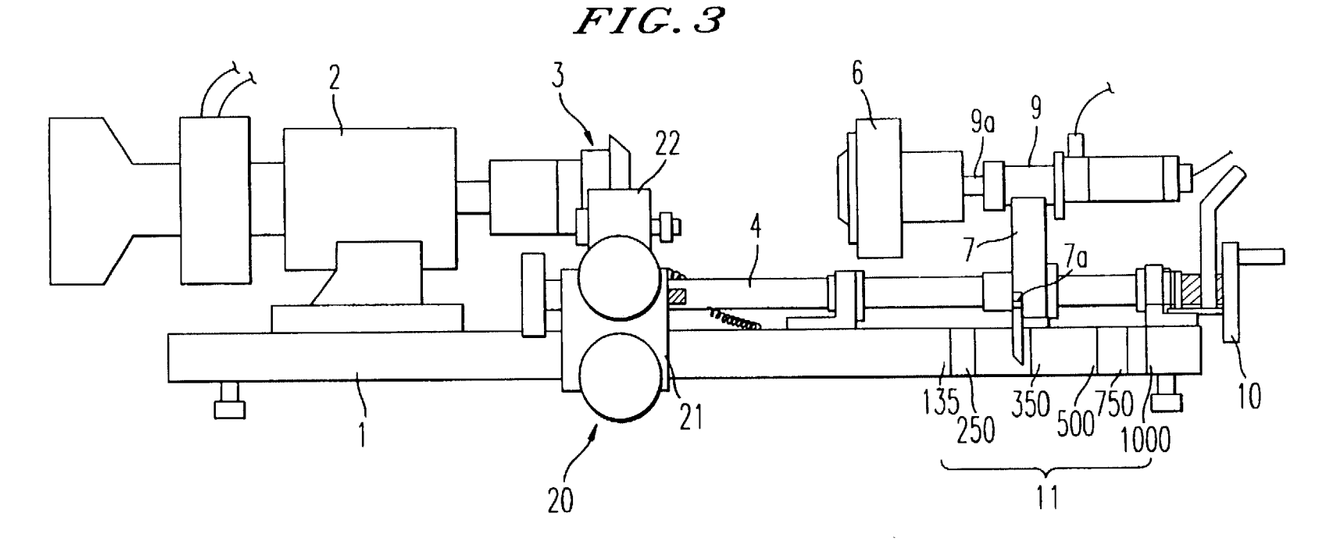
FIG. 3 is a side elevational view of the apparatus shown in FIG. 2.

FIG. 2 is a plan view of an apparatus for disassembling a can for measurement of dimensions of the seamed region of the can, according to a first embodiment of the present invention, and FIG. 3 is a side elevational view of the apparatus shown in FIG. 2.

As shown in FIGS. 2 and 3, an air motor 2 is fixedly mounted on a left-hand end (as shown) of a main frame 1 and has an output shaft to which there is secured a chuck 3 for fitting in an end attached to a can body. The drive source for actuating the chuck 3 is not limited to the air motor 2, but may be an electric motor.

Two guide shafts 4, 5 are disposed on a right-hand end (as shown) of the main frame 1 and extend parallel to the output shaft of the air motor 2, which serves as a rotating means. A cylinder support member 7 is slidably supported on the two guide shafts 4, 5. Centrally through the cylinder support member 7, there is threaded a cylinder moving screw shaft 8 which is rotatably supported on the main frame 1 and has one end to which a pusher adjusting handle 10 is fixed. When the pusher adjusting handle 10 is turned, the cylinder moving screw shaft 8 is rotated about its own axis to move the cylinder support member 7 in the axial direction of the guide shafts 4, 5. The cylinder support member 7 is thus axially movable to allow a pusher 6 (described later) and the chuck 3 to hold any of cans of various sizes. The cylinder support member 7 has a pointer 7a, and the main frame 1 has graduations 11 corresponding to cans of various sizes. The cylinder support member 7 can be positionally adjusted to bring the pointer 7a in alignment with one of the graduations 11 which corresponds to the size of a can to be held by the pusher 6 and the chuck 3.

An air cylinder 9 is fixedly mounted on the cylinder support member 7, the air cylinder 9 having a rod 9a whose distal end is directed toward the chuck 3. The pusher 6, which serves to hold the bottom of a can body, is rotatably mounted on the distal end of the rod 9a of the air cylinder 9. With a can disposed between the chuck 3 and the pusher 6, the rod 9a of the air cylinder 9 is extended until the can is clamped between the chuck 3 and the pusher 6 while the chuck 3 is being axially aligned with the can. The air cylinder 9 used has a rod stroke of 20 mm. As can be understood from the above description, the chuck 3, the pusher 6, and the air cylinder 9 jointly serve as a can holding means.

A cutter unit 20 is disposed on the main frame 1 laterally of the chuck 3. The cutter unit 20 comprises a side plate 21 fixed to the main frame 1, and a cutter support member 22 angularly movably supported on the side plate 21. A disk-shaped cutter 23 is rotatably mounted on an upper distal end of the cutter support member 22 for cutting the can-seamed region of a can. The cutter unit 20 will be described in greater detail with reference to FIG. 4.

The cutter 23 is rotatably mounted on the distal end of the cutter support member 22, and has a cutting blade directed toward the axis of a can when the can is held in position between the chuck 3 (see FIG. 2) and the pusher 6 (see FIG. 2). The cutter support member 22 is mounted on a support shaft 25 extending through two confronting surfaces of the side plate 21 for angular movement about the support shaft 25 selectively in the directions indicated by the arrows A, B in FIG. 4. A cutter return spring 24 is joined between a lower end (as shown ) of the cutter support member 22 and a spring retainer 1a (see FIG. 2) of the main frame 1 for normally urging the cutter support member 22 and hence the cutter 23 to move in the direction indicated by the arrow B in FIG. 4.

Figure 4:
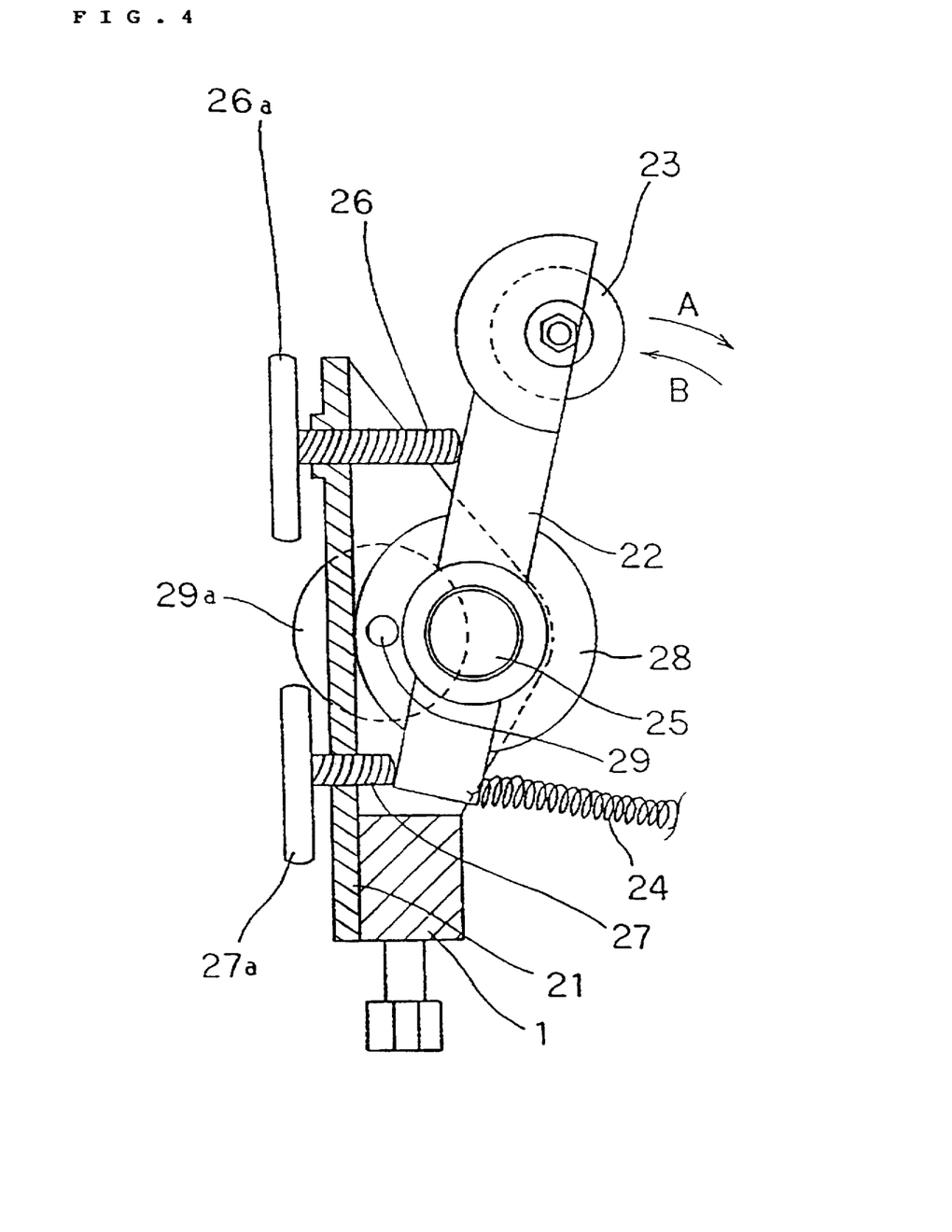
FIG. 4 is a partial cross-sectional view, as viewed from an air cylinder, of a cutter unit of the apparatus shown in FIG. 2.

A pusher adjustment screw 26 capable of abutment against a portion of the cutter support member 22 above the support shaft 25 is threaded through an upper end of the side plate 21. A pusher adjustment handle 26a is integrally coupled to an end of the push adjustment screw 26. When the push adjustment handle 26a is turned, the distance that the push adjustment screw 26 projects from the side plate 21 is adjusted to adjust the position of the cutter 23. Specifically, when the pusher adjustment screw 26 projects from the side plate 21, it pushes the cutter support member 22 to the right in FIG. 4, thus displacing the cutter 23 in the direction indicated by the arrow A against the bias of the cutter return spring 24. Conversely, when the push adjustment screw 26 is retracted toward the side plate 21, the cutter 23 is displaced in the direction indicated by the arrow B under the bias of the cutter return spring 24. The distance that the cutter 23 is displaced in the direction indicated by the arrow A is limited by a stopper 27 that is threaded through the side plate 21 for abutment against a portion of the cutter support member 22 below the support shaft 25. In FIG. 4, the cutter 23 is shown as being displaced a maximum distance in the direction indicated by the arrow A. The distance that the stopper 27 projects from the side plate 21 can be adjusted when a stopper handle 27a integrally coupled to an end of the stopper 27 is turned. The stopper 27 has the function of adjusting the limitation of the depth to which the seamed region is cut.

A plate member 28 rotatably coupled to the cutter support member 22 is rotatably mounted on the support shaft 25. A cutter slide screw 29 which is rotatably mounted on one of the confronting surfaces of the side plate 21 is threaded through the plate member 28. A cutter slide handle 29a is integrally coupled to one end of the cutter slide screw 29. When the cutter slide handle 29a is turned to rotate the cutter slide screw 29 about its own axis, the plate member 28 and hence the cutter 23 are displaced perpendicularly to the sheet of FIG. 4, making it possible to adjust the position for cutting the can.

Figure 5:
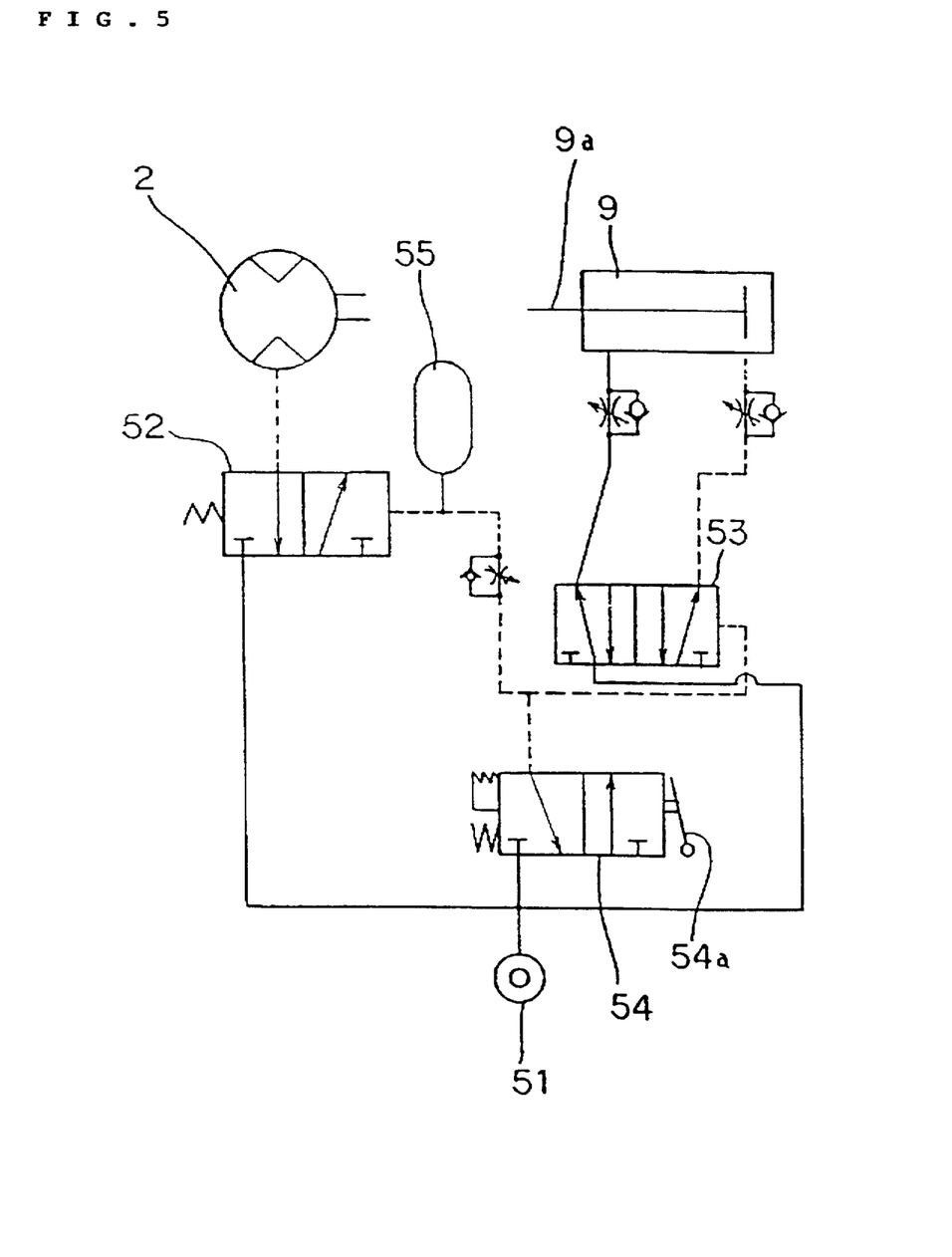
FIG. 5 is a circuit diagram of an air circuit of the apparatus shown in FIG. 2.

An air circuit of the apparatus will be described below. FIG. 5 is a circuit diagram of an air circuit of the apparatus shown in FIG. 2. As shown in FIG. 5, the air circuit has a first directional control valve 52 for actuating the air motor 2, a second directional control valve 53 for actuating the air cylinder 9, and a pedal-operated valve 54 having a pedal switch 54a for supplying directional control air to the first directional control valve 52 and the second directional control valve 53. The directional control valves 52, 53 and the pedal-operated valve 54 are supplied with air from an air source 51. A volume tank 55 is connected between the pedal-operated valve 54 and the first directional control valve 52. A path of air which flows when the pedal switch 54a of the pedal-operated valve 54 is turned off is indicated by the solid lines. A path of air which flows when the pedal switch 54a of the pedal-operated valve 54 is turned on is indicated by the broken lines.

When the pedal switch 54a of the pedal-operated valve 54 is turned off, the first directional control valve 52 is closed, and the air motor 2 is not actuated. When the pedal switch 54a of the pedal-operated valve 54 is turned on, a control input side of the first directional control valve 52 is supplied with air from the pedal-operated valve 54 through the volume tank 55, thereby opening the first directional control valve 52 to actuate the air motor 2. When the pedal switch 54a of the pedal-operated valve 54 is turned off, the second directional control valve 53 supplies air from the air source 51 to the air cylinder 9 along the solid-line path, thus retracting the rod 9a of the air cylinder 9. When the pedal switch 54a of the pedal-operated valve 54 is turned on, a control input side of the second directional control valve 53 is supplied with air from the pedal-operated valve 54. The air cylinder 9 is supplied with air along the broken-line path, and its rod 9a is extended.

Operation of the disassembling apparatus according to the first embodiment will now be described below with reference to FIGS. 2 through 5.

The pusher adjusting handle 10 is turned to adjust the position of the pusher 6 so that the pointer 7a of the cylinder support member 7 is aligned with one of the graduations 11 which corresponds to the size of a can to be disassembled. The cutter slide handle 29a is turned to position the cutter 23 anywhere in a range R (see FIG. 1) within an outer circumferential edge region B-C of the end 101 which externally surrounds the body hook 102a that is folded back from the can body. The cutter 23 is so positioned to allow the end 101 and the cover hook 101a to easily disengage from the body hook 102a.

The end 101 should preferably be cut in a range S extending from the tip end D of the cover hook 101a to an intermediate position in the outer circumferential edge region B-C of the end 101. If the position where the end 101 is to be cut were outside of the tip end D of the cover hook 101a, such as a position A, then since the distance between the cover hook 101a and the outer circumferential edge region B-C of the end 101 is generally small (about 0.4 mm), the measuring end of a measuring device such as a micrometer caliper or a vernier caliper used to measure the length CH of the cover hook 101a severed from the end 101 and separated from the can body 102 would not engage the tip end D of the cover hook 101a, so that the length CH would not be accurately be measured. Conversely, if the position where the end 101 is to be cut were close to the bend of the cover hook 101a, such as a position E, then the end 101 would not easily be separated from the can body 102 as the end 101 is firmly joined to the body hook 102a.

Then, the can is placed between the chuck 3 and the pusher 6, and the pedal switch 54a of the pedal-operated valve 54 is turned on. The control input side of the second directional control valve 53 is supplied with air from the pedal-operated valve 54, and the rod 9a of the air cylinder 9 is extended. The can is now gripped and held between the chuck 3 and the pusher 6. Air which flows from the pedal-operated valve 54 toward the control input side of the first directional control valve 52 is first accumulated in the volume tank 55, and thereafter supplied to the first directional control valve 52. Therefore, upon elapse of a certain period of time after the pedal switch 54a is turned on, the first directional control valve 52 is shifted to actuate the air motor 2. Consequently, the air motor 2 is actuated after the can has been held between the chuck 3 and the pusher 6. When the air motor 2 is actuated, the chuck 3 is rotated thereby rotating the can about its own axis.

When the can is rotated about its own axis, the push adjustment handle 26a is turned to project the push adjustment screw 26 for thereby pressing the cutter 23 against the can-seamed region of the can which is held between the chuck 3 and the pusher 6. Since the can is being rotated by the air motor 2 at this time, the outer circumferential edge region of the end 101 is cut fully along the outer circumferential surface of the can body 102 when the can makes one revolution. Inasmuch as the angular displacement of the cutter support member 22 has been limited to an amount depending on the diameter of the can by the stopper 27, the can body 102 (see FIG. 1) is prevented from being cut when the end 101 is cut.

When the severance of the outer circumferential edge region of the end 101 is finished, the pedal switch 54a of the pedal-operated valve 54 is turned off, shutting off the supply of air to the control input sides of the first and second directional control valves 52, 53. At the same time, air in the pipe interconnecting the pedal-operated valve 54 and the first and second directional control valves 52, 53 is discharged by the pedal-operated valve 54. Therefore, the air motor 2 is shut off, and the rod 9a of the air cylinder 9 is retracted, releasing the can. The released can is removed from the disassembling apparatus.

When the released can is removed from the disassembling apparatus, the end 101 (see FIG. 1) is taken from the can body 102. After the can-seamed region is notched by nippers, the remaining cover hook 101a is displaced toward the can bottom until it disengages from the body hook 102a, whereupon the disassembling of the can is finished. The cover hook 101a and the body hook 102a of the disassembled can are then presented to dimensional measurements.

As described above, while the can is being rotated with the end 101 and the can bottom being gripped to hold the can, the outer circumferential edge region of the end 101 which externally surrounds the folded portion of the can body 102 in the can-seamed region is cut by the cutter 23. Even if the operator of the apparatus has very little skill, the can is prevented from being deformed, and the body hook 102a is prevented from being pressed at the time the cover hook 101a is removed. Consequently, the can is easily disassembled and the cover hook 101a is removed without deforming the portions whose dimensions are to be measured.

For disassembling cans of different diameters, a plurality of types of chucks 3 corresponding to those different diameters of cans to be held in position are made available to facilitate the positioning of those cans when they are to be held in position.

An experiment was conducted to compare a process (hereinafter referred to as an "automatic disassembling process") in which cans were disassembled by the disassembling apparatus according to the present invention and a process (hereinafter referred to as a "conventional process") in which cans were manually disassembled.

Periods of time required to disassemble beer cans were compared with each other. In this experiment, the air motor was rotated and hence the beer cans were rotated at a speed of 130 rpm, and periods of time required to disassemble 10 beer cans of each of various sizes were compared with each other. The results of the experiment are given in Table 1 below.

TABLE 1

|  | Conventional process | Automatic disassembling process |
| --- | --- | --- |
| 135, 250, 350, 500 ml | 10 min. | 5 min. |
| 750, 1000 ml, Steel can | 15 min. | 5 min. |

It can be seen from Table 1 that the cans can be disassembled according to the automatic disassembling process in periods of time which are half or less than periods of time required by the conventional process, and hence the periods of time required to disassemble the cans are greatly reduced according to the automatic disassembling process.

In order to confirm that there is no problem with disassembling cans with the disassembling apparatus according to the present invention, beer cans sampled at the same time were disassembled according to the automatic disassembling process and the conventional process, and measured dimensions of the body and cover hooks were tested for the mean values and variances. 40 beer cans were disassembled according to each of the automatic disassembling process and the conventional process, and three dimensions of the body and cover hooks were measured per beer can. The results of the test are given in Table 2 below.

TABLE 2

|  |  | Body hook | | Cover hook | |
| --- | --- | --- | --- | --- | --- |
|  |  | Conventional process | Automatic disassembling process | Conventional process | Automatic disassembling process |
| 350 ml | x | 1.733 | 1.733 | 1.776 | 1.767 |
| can | $\delta_{n-1}$ | 0.056 | 0.055 | 0.061 | 0.053 |
| 500 ml | x | 1.703 | 1.702 | 1.853 | 1.843 |
| can | $\delta_{n-1}$ | 0.072 | 0.071 | 0.051 | 0.055 |

It can be seen from Table 2 that the differences, tested by the t test, between the mean values of the dimensions of the body and cover hooks of the 350 ml and 500 ml beer cans disassembled according to the automatic disassembling process and the conventional process do not indicate differences between the automatic disassembling process and the conventional process at a significant level of 5%. Similarly, the variances, tested by the F test, of the dimensions do not indicate differences between the automatic disassembling process and the conventional process at a significant level of 5%. Therefore, no differences are present between the measured dimensions of the beer cans disassembled according to the automatic disassembling process and the conventional process. Those cans which are disassembled according to the automatic disassembling process can sufficiently be used for dimensional measurements.

(2nd Embodiment)

In the above embodiment, the position of the air cylinder is manually adjusted depending on the size of a can to be disassembled, and the cutter 23 is also manually operated to cut into the can. Another embodiment in which no manual adjustment and operation is required will be described below.

Figure 6:
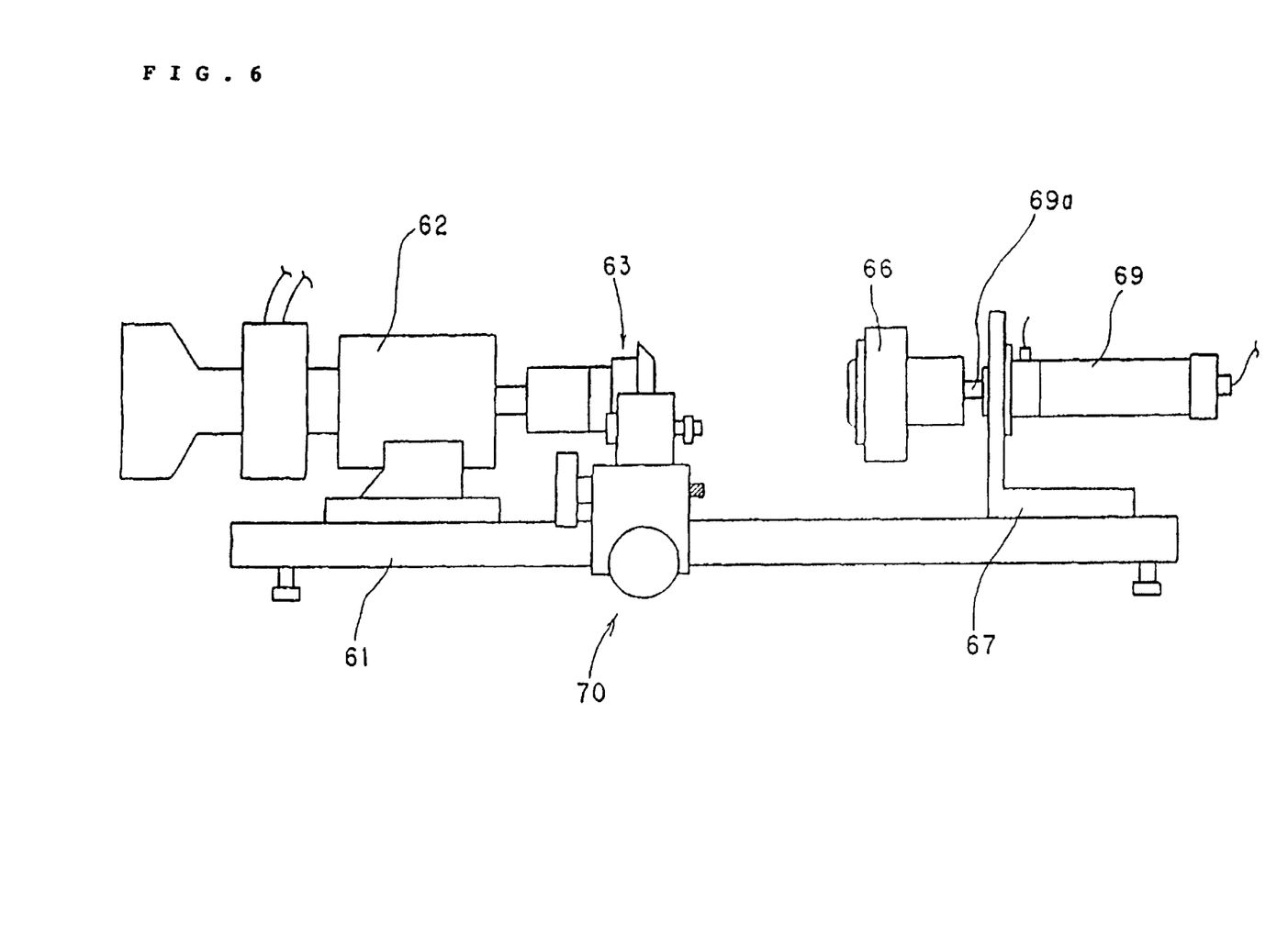
FIG. 6 is a side elevational view of an apparatus for disassembling a can for measurement of dimensions of the seamed region of the can, according to a second embodiment of the present invention.

FIG. 6 is a side elevational view of an apparatus for disassembling a can for measurement of dimensions of the seamed region of the can, according to a second embodiment of the present invention. As shown in FIG. 6, a first air cylinder 69 has a rod 69a with a pusher 66 rotatably mounted on its distal end and is fixedly mounted on a main frame 61 by a cylinder support member 67. To allow the air cylinder 69 to be able to hold cans of various heights without positional adjustments, the stroke of the rod 69a is longer than the difference between maximum and minimum heights of cans to be disassembled. The air cylinder 69 is positioned such that it can hold a can of a minimum height with the rod 69a extended to its full stroke. For example, if beer cans are to be disassembled, the rod 67a has a stroke of 100 mm.

Figure 7:
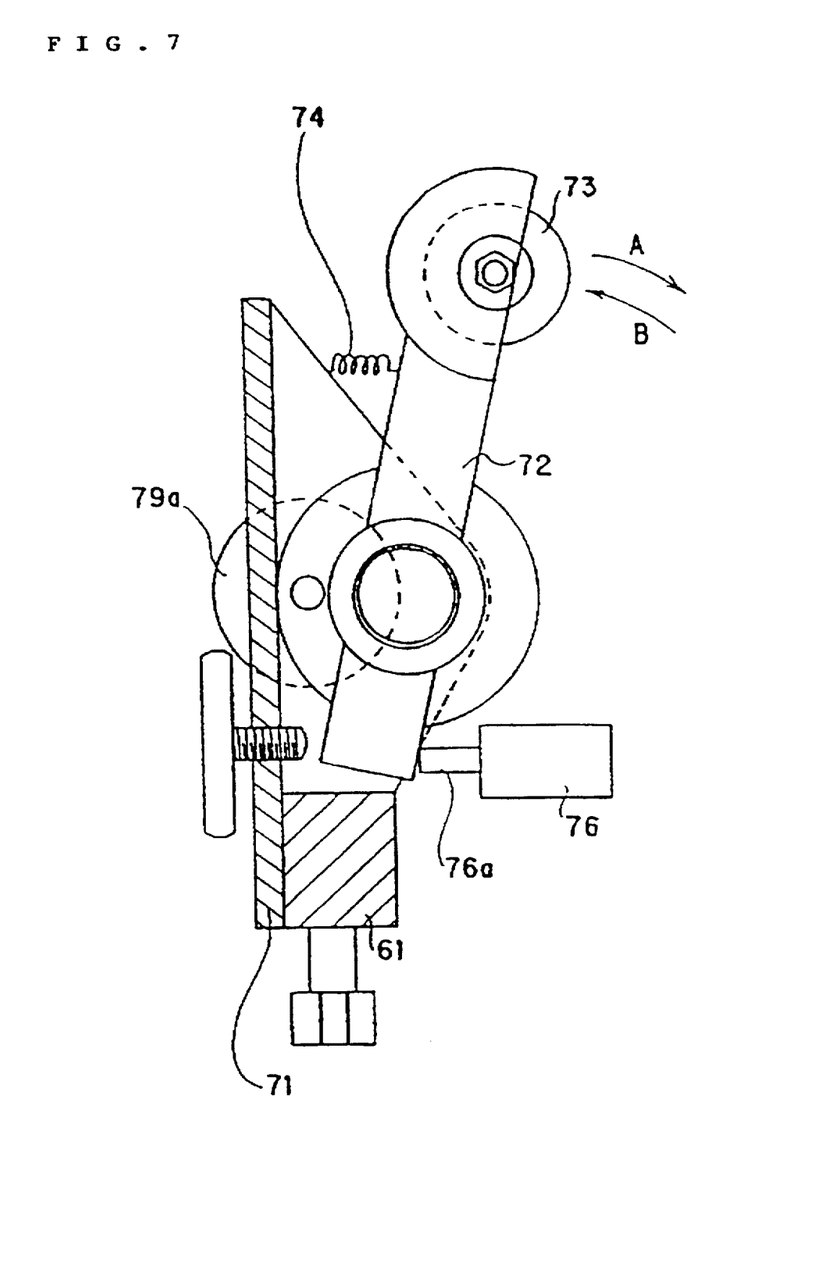
FIG. 7 is a partial cross-sectional view, as viewed from a first air cylinder, of a cutter unit of the apparatus shown in FIG. 6.

A cutter unit 70 has a second air cylinder 76, as shown in FIG. 7, having a rod 76a which, when extended, presses a lower end of a cutter support member 72 to the left as shown, thus angularly moving the cutter support member 72 in the direction indicated by the arrow A. The cutter support member 72 is normally urged to turn in the direction indicated by the arrow B by a cutter return spring 74 acting between the cutter support member 72 and a side plate 71. Therefore, when the rod 76a of the second air cylinder 76 is extended, a cutter 73 on an upper end of the cutter support member 72 is angularly displaced in the direction indicated by the arrow A against the bias of the cutter return spring 74. When the rod 76a of the second air cylinder 76 is retracted, the cutter 73 is angularly displaced in the direction indicated by the arrow B under the bias of the cutter return spring 74. The rod 76a of the second air cylinder 76 and the cutter support member 72 may be coupled to each other by a link mechanism which causes the cutter 73 to move in the directions indicated by the arrows A, B in response to movement of the rod 76a of the second air cylinder 76. Such an arrangement dispenses with the cutter return spring 74.

Figure 8:
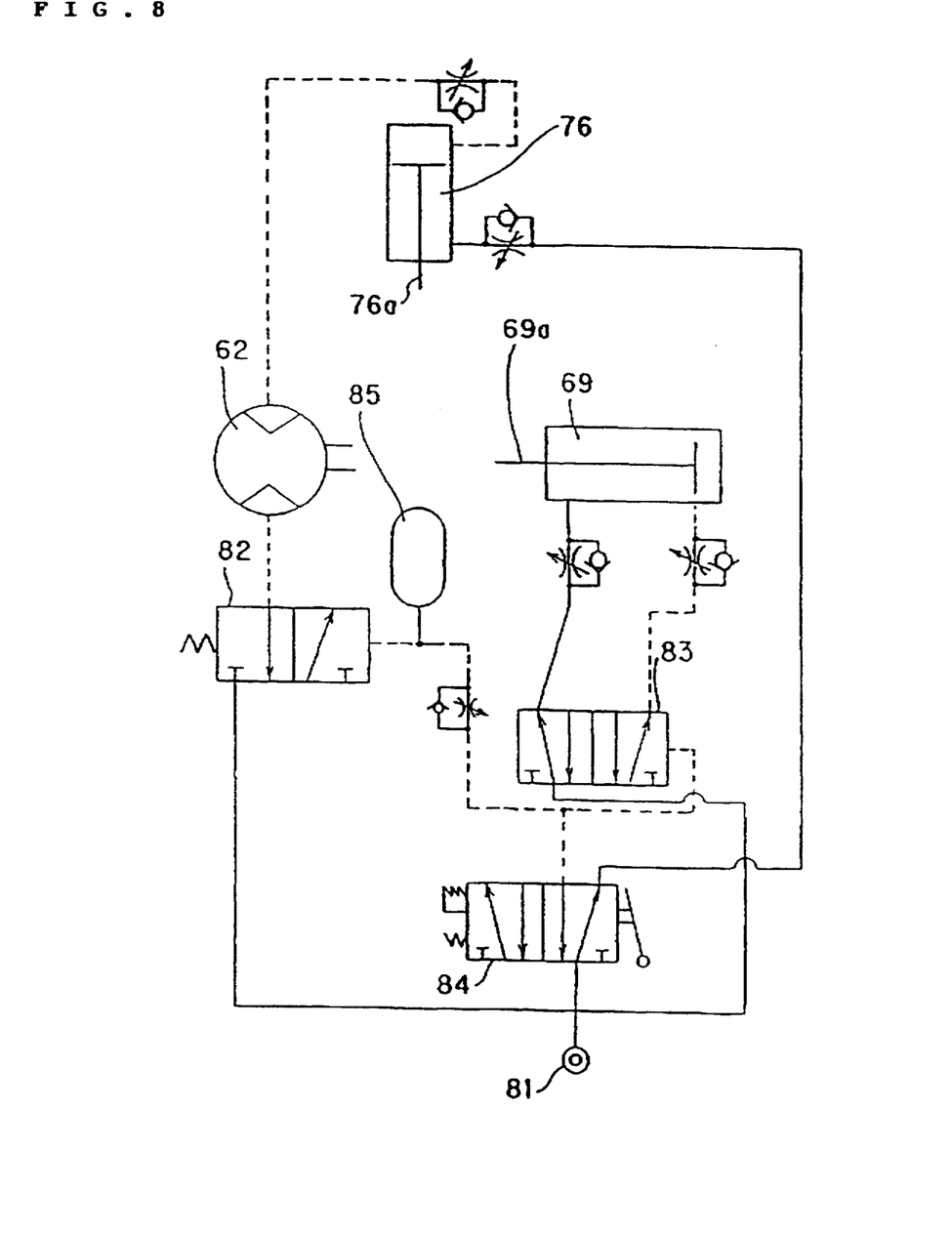
FIG. 8 is a circuit diagram of an air circuit of the apparatus shown in FIG. 6.

An air circuit of the apparatus according to the second embodiment will be described below with reference to FIG. 8. As shown in FIG. 8, a path of air which flows when a pedal-operated valve 84 is turned off is indicated by the solid lines, and a path of air which flows when the pedal-operated valve 84 is turned on is indicated by the broken lines. The air circuit has a first directional control valve 82 for actuating an air motor 62, a second directional control valve 83 for actuating the first air cylinder 69, a pedal-operated valve 84 for supplying directional control air to the first directional control valve 82 and the second directional control valve 83 when a pedal switch thereof is turned on, and a volume tank 85 connected between the pedal-operated valve 84 and the first directional control valve 82. The directional control valves 82, 83 and the pedal-operated valve 84 are supplied with air from an air source 81. Air for extending the rod 76a of the second air cylinder 76 is supplied from the air motor 62. When the pedal-operated valve 84 is turned off, the rod 76a of the second air cylinder 76 is retracted by air supplied from the air source 82 through the pedal-operated valve 84.

The features of the disassembling apparatus according to the second embodiment have been described above. Other details of the disassembling apparatus according to the second embodiment are identical to those of the disassembling apparatus according to the first embodiment, and will not be described in detail below.

Operation of the disassembling apparatus according to the second embodiment will be described below with reference to FIGS. 6 through 8.

As with the first embodiment, after the cutter 73 is positionally adjusted by a cutter slide handle 79a, a can is placed between a chuck 63 and the pusher 66, and then the pedal-operated valve 84 is turned on. Air is supplied to a control input side of the second directional control valve 83, extending the rod 69a of the first air cylinder 69 for thereby holding the can. Air which flows toward the control input side of the first directional control valve 82 is first accumulated in the volume tank 85, and thereafter supplied to the first directional control valve 82. Therefore, upon elapse of a certain period of time after the can is held by the actuation of the first air cylinder 69, the air motor 62 is actuated, rotating the chuck 63 thereby rotating the can about its own axis.

Since the air supplied to the air motor 62 is further supplied to the second air cylinder 76, the rod 76a of the second air cylinder 76 is extended in response to the actuation of the air motor 62, pressing the cutter 73 against the can-seamed region of the can. When the can makes one revolution, the outer circumferential edge region of the end 101 (see FIG. 1) is cut along the outer circumferential surface of the can.

After the severance of the outer circumferential edge region of the end 101 is finished, the pedal-operated valve 84 is turned off. The air motor 62 is shut off, and the rod 76a of the second air cylinder 76 is retracted, returning the cutter 73 to its original position. The rod 69a of the first air cylinder 69 is also retracted, releasing the can.

The released can is removed from the disassembling apparatus. The subsequent process is the same as that of the disassembling apparatus according to the first embodiment, and will not be described below.

As described above, inasmuch as the cutter 73 is pressed against the can-seamed region of the can by the second air cylinder 76, the outer circumferential edge region of the end 101 is automatically cut simply when the pedal-operated valve 84 is turned on after the can is held in position. Consequently, the outer circumferential edge region of the end 101 can be severed easily. Since the rod 69a of the first air cylinder 69 has a long stroke, cans of different heights to be disassembled can easily be held in position without positionally adjusting the first air cylinder 69 each time such a can is to be held in position.

In each of the above embodiments, the can is placed horizontally when it is disassembled. With the can placed horizontally, however, the liquid in the can may leak out from the cut region. To avoid this, the disassembling apparatus may be vertically oriented with the pusher positioned downwardly, and the pusher may have a can-holding recess in its surface for engaging the bottom of the can. According to such a modification, the can is placed on the pusher, and the pusher is lifted by the air cylinder until the can is held against the chuck. Therefore, the seamed region of the can can be severed while the can is placed vertically.

In the disassembling method according to the present invention, a can is held in position by gripping an end thereof and a bottom of a can body, and the outer circumferential edge region of the end which externally surrounds a folded portion of the can body in a can-seamed region is cut in the circumferential direction of the can. The can can easily be disassembled without deforming portions whose dimensions are to be measured, irrespective of the skill of the operator. As a result, the time required to disassemble the can is greatly reduced, and accurate dimensions of the seamed region of the can can easily be obtained.

The disassembling apparatus according to the present invention has a can holding means for holding a can by gripping an end of the can and a bottom of a can body, a rotating means for rotating the can which is held by the can holding means, and a cutter disposed so as to orient a cutting blade toward the axis of the can. The apparatus can reliably cut the can-seamed region of the can circumferentially, and is suitable for carrying out the disassembling method for measurement of can seam dimensions according to the present invention.

The can holding means may have a mechanism for abutting against the end of the can, and a mechanism for abutting against the bottom of the can body, the mechanisms being spaced from each other by an adjustable distance. This arrangement allows the apparatus to disassemble cans of any of a plurality of types having different heights. The cutter may be movable in the radial direction of a can which is held in position, so that the apparatus to disassemble cans of plural types having different diameters.

We claim:

1. A method of disassembling a can and measuring seam dimensions of the can, the can including a can body and an end member which are coupled to each other by a can-seamed region, the can body having an end opening closed by the end member thereby sealing the interior of the can and the end member including a cover hook, said method comprising the steps of:

holding the can by gripping the end and a bottom of the can body;

cutting the outer circumferential edge region of the end member which externally surrounds a folded portion of the can body in the can-seamed region in a circumferential direction of the can;

separating the cover hook from the end member: and measuring the dimensions of the can-seamed region.

2. An apparatus for disassembling a seamed region of a can, the can including a can body and an end member which are coupled to each other by the can-seamed region, the can body having an end opening closed by the end member and sealing the interior of the can and the end member including a cover hook, said apparatus comprising:

can holding means for holding the can by gripping the end member and a bottom of the can body;

rotating means for rotating the can about its own axis which is held by said can holding means; and a cutter disposed so as to orient a cutting blade of the cutter toward the axis of the can, said cutter cutting the outer circumferential edge region of the end member which externally surrounds a folded portion of the can body in the can-seamed region in a circumferential direction of the can and cutting the can-seamed region such that said cover hook is removable from the end member to permit measuring of the dimensions of the can-seamed region.

3. An apparatus according to claim 2, wherein said can holding means comprises a mechanism abutting against the end of the can and a mechanism abutting against the bottom of the can body, the mechanisms being spaced from each other by an adjustable distance.

4. An apparatus according to claim 2, wherein said cutter is movable in the radial direction of the can which is held by said can holding means.

5. An apparatus for disassembling a seamed region of a can so as to permit inspection of the seamed region of the can, the can including a can body and an end member which are coupled to each other by said can-seamed region, the can body having an end opening closed by the end member and sealing the interior of the can and said can-seamed region including a cover hook, said apparatus comprising:

a can holder holding the can by gripping the end member and a bottom of the can body;

a rotating device rotating the can about its own axis which is held by said can holder; and a cutter disposed so as to orient a cutting blade of the cutter toward the axis of the can, said cutter cutting the outer circumferential edge region of the end member which externally surrounds a folded portion of the can body in the can-seamed region in a circumferential direction of the can and cutting the can seamed region such that said cover hook is removable from the end member to permit measuring of the can-seamed region.

6. An apparatus according to claim 5, wherein said can holder comprises a first mechanism abutting against the end member and a second mechanism abutting against the bottom of the can body, the first and second mechanisms being spaced from each other by an adjustable distance.

7. An apparatus according to claims 5 or 6, wherein said cutter is movable in the radial direction of the can which is held by the can holder.

* * * * *